US012145370B2

(12) United States Patent
Marie-Couste et al.

(10) Patent No.: US 12,145,370 B2
(45) Date of Patent: Nov. 19, 2024

(54) METHOD FOR FILLING AN INK CARTRIDGE AND A FILLING STATION IMPLEMENTING SAID METHOD

(71) Applicant: FILL' N PRINT, Plougastel Daoulas (FR)

(72) Inventors: Eddy Marie-Couste, Plougastel Daoulas (FR); César Theard, Brest (FR)

(73) Assignee: FILL' N PRINT, Plougastel Daoulas (FR)

( * ) Notice: Subject to any disclaimer, the term of this patent is extended or adjusted under 35 U.S.C. 154(b) by 103 days.

(21) Appl. No.: 17/923,434

(22) PCT Filed: May 20, 2021

(86) PCT No.: PCT/EP2021/063413
§ 371 (c)(1),
(2) Date: Nov. 4, 2022

(87) PCT Pub. No.: WO2021/234068
PCT Pub. Date: Nov. 25, 2021

(65) Prior Publication Data
US 2023/0191788 A1 Jun. 22, 2023

(30) Foreign Application Priority Data
May 20, 2020 (FR) ....................................... 2005240

(51) Int. Cl.
*B41J 2/175* (2006.01)

(52) U.S. Cl.
CPC ....... *B41J 2/17506* (2013.01); *B41J 2/17556* (2013.01); *B41J 2/17559* (2013.01)

(58) Field of Classification Search
None
See application file for complete search history.

(56) References Cited

U.S. PATENT DOCUMENTS

| | | | |
|---|---|---|---|
| 5,790,157 | A | 8/1998 | Higuma et al. |
| 6,158,851 | A | 12/2000 | Zepeda |

(Continued)

FOREIGN PATENT DOCUMENTS

| | | | |
|---|---|---|---|
| EP | 1013446 | B1 | 5/2003 |
| WO | 0228715 | A1 | 4/2002 |

(Continued)

*Primary Examiner* — Alejandro Valencia
(74) *Attorney, Agent, or Firm* — H&I PARTNERS; Chai Im; C. Andrew Im

(57) ABSTRACT

A method for filling an ink cartridge for a printer in an ink-filling station. The type of cartridge to be filled is determined and information associated with the cartridge to be filled is sought in a database. The cartridge is placed in the station. The cartridge includes a wall separating a reservoir of the cartridge from the outside. An opening passing through the wall from the outside to the reservoir is pierced, the position of the opening depends on the information. The cartridge is filled by injecting ink through the opening under ink-injection conditions dependent on the information. The opening is sealed by cooling a deposit of molten plastics material in the opening under sealing conditions dependent on the information. An internal reservoir is taken to a set pressure by blowing or sucking air to pressurize or depressurize the internal reservoir.

9 Claims, 6 Drawing Sheets

(56) References Cited

U.S. PATENT DOCUMENTS

| | | | | |
|---|---|---|---|---|
| 8,960,868 | B1 * | 2/2015 | Turgeman | B41J 2/17506 347/85 |
| 2003/0170411 | A1 * | 9/2003 | Eida | B65D 81/268 428/35.7 |
| 2006/0017789 | A1 * | 1/2006 | Fletcher | B41J 2/17506 347/85 |
| 2006/0109320 | A1 | 5/2006 | Cutler et al. | |
| 2018/0311962 | A1 | 11/2018 | White et al. | |

FOREIGN PATENT DOCUMENTS

| | | | |
|---|---|---|---|
| WO | 2005032825 | A1 | 4/2005 |
| WO | 2007030504 | A2 | 3/2007 |
| WO | 2007086848 | A1 | 8/2007 |

* cited by examiner

METHOD FOR FILLING AN INK CARTRIDGE AND A FILLING STATION IMPLEMENTING SAID METHOD

RELATED APPLICATIONS

This application is a § 371 application of PCT/EP2021/063413 filed May 20, 2021, which claims priority from French Patent Application No. 2005240 filed May 20, 2020, each of which is incorporated herein by reference in its entirety.

TECHNICAL FIELD OF THE INVENTION

The present invention relates to a method for filling an ink cartridge and a filling station implementing said method. It applies in particular to the devices for filling ink cartridges for all types of ink-jet printer.

BACKGROUND OF THE INVENTION

Ink cartridges are consumables that have become essential at the present time for individuals and companies, since ink-jet printing is very widespread because in particular of its attractive quality-to-price ratio.

The market for ink-jet printers is distributed between various makes, which have opted for various print technologies.

Each technology imposes specific technical constraints on the cartridges developed by these various manufacturers.

The ink cartridges available on the market at the present time are highly technological products, meeting constraints of geometry, pressurization, feed-rate control, etc. that are very precise.

Very often, an empty cartridge can be filled only by means of a particular tool, adapted to the cartridge in question, and requiring particular knowledge by the operator responsible for filling.

There are at the present time techniques for recycling by filling ink cartridges specific to each cartridge technology, as known from the publication document of the patent EP 1013446 filed by the company Seiko Epson, or the publication document of the U.S. Pat. No. 6,158,851 filed by the company Hewlett Packard.

There is also the document WO 2007/030504, which describes a machine with several operations that the operator must follow in accordance with an aid to use. There is also the document US 2006/109320, which describes a machine and a method to be used for recharging ink-jet cartridges with numerous manual steps.

It is clear that the methods and devices proposed in these documents relate to a specific type of cartridge, in particular types of cartridge offered by the filing companies.

Because of the great differences between the cartridge technologies, and because of the great complexity of these technologies, there is not at the present time either an entirely automatic device or method for filling any type of cartridge currently on the market, but only techniques specific to a type of cartridge.

A technique making it possible to reconstitute the original state of the cartridge after filling, in order to allow a practically unlimited number of recyclings/refillings, and to guarantee conditions of use identical to those of a new cartridge, in particular in order not to damage the corresponding printer, is also not known.

Finally, a universal method and device for any type of cartridge, making it possible to fill any known type of cartridge for an ink-jet printer, is also not known.

OBJECT AND SUMMARY OF THE INVENTION

The present invention aims to remedy these drawbacks with a completely innovative approach.

For this purpose, according to a first aspect, the present invention relates to a method for filling an ink cartridge for a printer in an ink-filling station, comprising the following steps:

- determining the type of cartridge to be filled;
- seeking, in a database, at least one item of information associated with said cartridge to be filled;
- placing the cartridge to be filled in the ink-filling station, said ink cartridge to be filled comprising a wall separating one or more internal reservoirs of the cartridge from the outside of the cartridge;
- piercing an opening passing through the wall from the outside of the cartridge to said internal reservoir, the position of said through opening depending on the information associated with said cartridge to be filled;
- filling, by injecting ink through said through opening of said internal reservoir under ink-injection conditions, relating to the rate of injection of ink and the time both dependent on said information associated with said cartridge to be filled, the filling of the reservoir with ink is implemented through a filling needle introduced into said internal reservoir, the depth of penetration of the filling needle in the internal reservoir being fixed, or changing over time continuously or discretely, said depth being dependent on the information associated with the cartridge;
- sealing by cooling a deposit of molten plastics material in said through opening under sealing conditions dependent on the information associated with said cartridge to be filled, said plastics material is a polylactic acid (PLA) polymer comprising between 0 and 5% additive, said additive having properties of reducing the crystallization kinematics of said PLA polymer;
- pressurizing or depressurizing following the sealing step, during which the at least one internal reservoir is taken to a set pressure by blowing or sucking air in said internal reservoir.

By virtue of these provisions, the steps of piercing, filling, sealing and pressurization or depressurization can be precisely adapted to all types of cartridge, the data necessary for implementing these steps being given in the database. It is therefore solely necessary to manually enter the cartridge reference, therefore corresponding to the type of cartridge to be filled, to place the cartridge in the filling station, the remainder of the steps being completely automatic until the cartridge is returned to the user.

The operator therefore gives information on the quality of the cartridge submitted and in a single step without action by the operator, the method enables the cartridge to be returned in the initial condition of the consumable, as required by the equipment of the manufacturer (volume, pressure, thermodynamics, kinetics, etc.). Analysis of the onboard electronics makes it possible to achieve this.

The needle described in the documents of the prior art such as the document WO 2007/030504 has only two positions: in or out/pressed in or withdrawn/interior or exterior. In the present method, the dynamic positioning of the needle proceeds from a veritable inventive method since it allows a phased filling, respecting the differences in spongy reservoirs inside the cavity containing the ink; there are, in many cartridges, felts of various densities and static and dynamic characteristics, in superimposed layers, etc., and, to respect the specific characteristics of the manufacturer, it is impossible to fill the various layers in a single phase since different flow rates, pressures and absorption times are necessary between the layers. The present step makes it possible to have a variable and changing flow rate, time or depth.

In addition, sealing by depositing molten plastics material makes it possible to reconstitute the previously pierced cartridge and to return it in a state almost entirely corresponding to its original state, guaranteeing correct operation thereof and of the dedicated printer.

The internal volume of the cartridge changes considerably in percentage between closure by adhesive and plugging by material filling the orifice. In the case of the method at the moment of the sealing step and in the case of double skin, the reservoir of the cartridge remains in communication with secondary spaces of which it should remain independent. Thus, the different volumes bringing fundamental changes in physical and thermodynamic conditions are respected (pressure, volume, fluid flows, etc.).

The pressurization or depressurization step is also an arrangement making it possible to recreate the pressure conditions inside the cartridge as required by the manufacturer of the cartridge.

By means of these provisions, all the constraints related to the type of ink reservoir in the cartridge (i.e., whether it be liquid, spongy, semi-spongy, in stages, etc.) can be respected by injecting the ink on a movement travel in depth adapted to the type of cartridge.

By means of these provisions, it is firstly possible to use a material that can easily be stored in the form of granules or fiber, and secondly the use of an additive makes it possible to considerably reduce the waiting time for cooling the material, and therefore makes it possible to achieve a predetermined degree of crystallization of the material more quickly than in the absence of additive. In addition, without additive it is necessary to increase the cooling kinematics (for example by convection) in order to obtain cooling in a period identical to a material with additive.

The invention is advantageously implemented according to the embodiments and variants disclosed below, which are to be considered individually or according to any technically operative combination.

In one embodiment, at said step of pressurizing or depressurizing, the blowing or suction of air into the internal reservoir is implemented through an air-injection needle introduced into the molten plastics material, said needle being withdrawn after the set pressure is achieved and after a degree of crystallinity of the plastics material of less than or equal to 20% is achieved.

By means of these provisions, it is possible to put the internal reservoir or reservoirs of the cartridge at a nominal pressure required by the manufacturer, and in particular to guarantee a constant internal pressure in the various internal parts of the reservoir. The opening left by the air-injection needle making it possible to over-pressurize or under-pressurize the reservoir is spontaneously closed as described above, without risking yielding to the over-pressure or under-pressure created in the cartridge.

In one embodiment, at said step of pressurizing or depressurizing, the blowing or suction of air in the internal reservoir is implemented through an ink outlet of said cartridge.

By means of these provisions, it is possible to achieve, alternatively or in combination, an over-pressurizing or under-pressurizing by using the existing openings of the cartridge.

In one embodiment, the information associated with the cartridge to be filled comprises at least the elements in the following group:

a) the number of piercings of through openings to be made;

b) the position of each piercing of through opening to be made;

c) the type of technology of each internal reservoir of the cartridge;

d) the types of ink to be injected;

e) the number of filling points for each type of ink to be injected;

f) the filling rate of each internal reservoir of the cartridge;

g) the filling pressure of the ink of each internal reservoir;

h) the duration of filling of each internal reservoir of the cartridge;

i) the number of sealings of through openings to be implemented;

j) the position of each through-opening sealing to be implemented;

k) the melting point, the speed of injection and the injection-pressure gradient of the sealing material for each through opening to be sealed;

l) the filling pressure of each internal reservoir.

These data make it possible to implement all the essential steps for filling the cartridge with the method according to the invention. Any additional data also makes it possible to increase the performances of said method. In addition, all these data are either easily recoverable from the manufacturers of cartridges, or are supplied by the machines and the tools used for implementing the present method.

In one embodiment, the method furthermore comprises:

- an emptying step preceding the piercing step, during which each internal reservoir of the cartridge is emptied of a residual volume of ink;
- a priming step following the pressurization or depressurization step, during which a predetermined volume of ink filled in the cartridge is expelled from the cartridge at an ink outlet of the cartridge.

By means of these provisions, the cartridge can firstly be perfectly emptied of any residual ink, and secondly prepared for use thereof after filling, by bringing the filled ink close to the ink outlet, and in particular avoiding any formation of air pockets in the cartridge preventing the ink from emerging during a first printing with the cartridge.

In one embodiment, the method furthermore includes a step of cleaning one or more print heads of the cartridge, said cleaning step preceding the piercing step.

By means of these provisions, the print heads are freed from any impurities due to the previous use of the cartridge, and make it possible to restore an ink cartridge to a state close to the new state for the user.

According to a second aspect, the present invention relates to a station for filling an ink cartridge for a printer according to the implementation of the filling method according to the invention, said station comprising:

- an external envelope provided with an opening for placing and retrieving the cartridge;
- a carousel of supports adapted for accommodating various types of cartridge;
- a milling unit comprising a movable milling tool;
- an ink-injection unit comprising a carousel of filling needles, and one or more ink reservoirs to be injected;

a unit for injecting sealing material comprising a reserve of one or more sealing materials, an element heating the sealing material and a movable nozzle;

an interface to a database including the information associated with the type of cartridge;

a pressurization or depressurization unit, comprising one or more air-injection needles and a reversible compressive system;

a central electronic unit adapted for processing the information associated with the type of cartridge and for controlling the piercing, ink-injection and material-injection units, and the carousel of supports.

In one embodiment, furthermore comprising a man-machine interface making it possible to determine the type of cartridge from information transmitted through said interface.

In one embodiment, the filling station furthermore comprises:

a print-head cleaning unit;

an emptying unit, comprising a reservoir for emptying the residual ink in the cartridge;

a priming unit, comprising a means for expelling a predetermined volume of ink filled in the cartridge at an ink outlet of the cartridge.

The advantages, aims and particular features of this device being similar to those of the method that is the object of the present invention, they are not repeated here.

BRIEF DESCRIPTION OF THE FIGURES

Other advantages, aims and features of the present invention will emerge from the description that follows, for an explanatory and in no way limitative purpose, with regard to the accompanying drawings, wherein.

DESCRIPTION OF EMBODIMENTS

Figure 1:
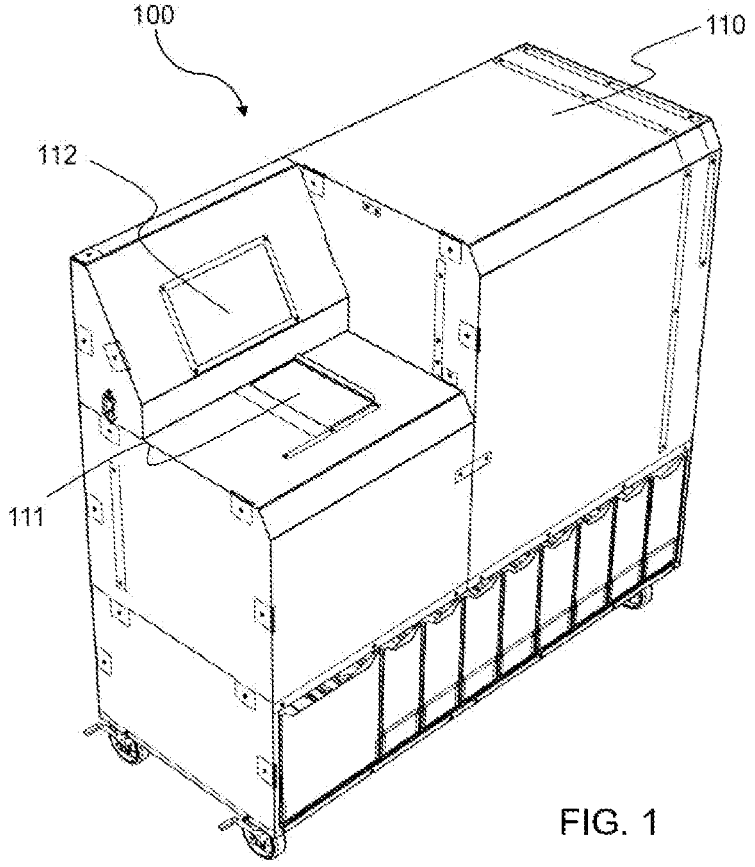
FIG. 1 shows a diagram in perspective view of the filling station according to the invention.

FIG. 1 shows a filling station 100 for ink cartridges for printers.

The filling station 100 comprises an external casing 110 with a substantially straight parallelepipedal shape with a recess in one of the tops, although any other form is possible. The main objective of this external casing 110 is to protect the interior of the filling station 100, and to offer an aesthetic visual appearance for the filling station 100, said station being intended to be disposed in particular in a space accessible to the public.

The external casing 110 has an opening 111 for placing and retrieving the cartridge, the opening optionally being closed by a door with automatic or manual opening, in order to protect access to said opening 111 during the operation of the filling station 100.

Provision is moreover made for the external casing 110 to have a top cover and/or access flaps to the inside of the external casing 110, to allow maintenance operations.

Advantageously, the external casing 110 also has a man-machine interface 112, such as a touch screen as shown on FIG. 1, or a screen and/or a keypad, a microphone, a camera, etc. Provision is made for a user wishing to fill a cartridge 200 to be able to enter the type of cartridge that they wish to fill, i.e., generally the manufacturer reference of said cartridge.

Inside the filling station 100 a central electronic unit 113 is disposed, this unit being more particularly a microprocessor.

The central electronic unit 113 is connected to the man-machine interface 112, so as to be able to process the information entered through this interface, as well as a carousel of supports 130, and to the milling 140, ink-injection 150 and sealing-material injection 160 units described below, as well as more widely to any electronic element of the filling station 100. The previously mentioned units, as well as a number of other units and components presented below, are grouped together in a tool unit 120, as visible in FIG. 2.

Moreover, the central electronic unit 113 is also connected to an interface 114 for access to a database 180.

The database 180 advantageously consists of a non-volatile storage memory 181 included in the filling station 100, said memory being able to be easily updated by an operator having access to said memory.

According to a variant embodiment, the database 180 is a server 182 remote from the filling station 100, the access interface being in this case a module for access to a network, cabled or not, making it possible to access the server 182.

The database 180 contains, for each type of cartridge listed, information associated with said cartridge. More precisely, said information comprises data relating to the filling steps that will be described hereinafter, so that the steps can be adapted to any type of cartridge, while respecting the constraints given by the manufacturer of the cartridge, and the constraints intrinsic to the cartridge, such as in particular its geometry.

When the user determines the type of cartridge to be filled via the man-machine interface 112, the information associated with the type of cartridge is sought in the database 180. This information is next loaded in a memory, preferably volatile, of the central electronic unit 113, said information subsequently being used for implementing the filling of the cartridge according to the constraints of the type of cartridge determined.

Figure 2:
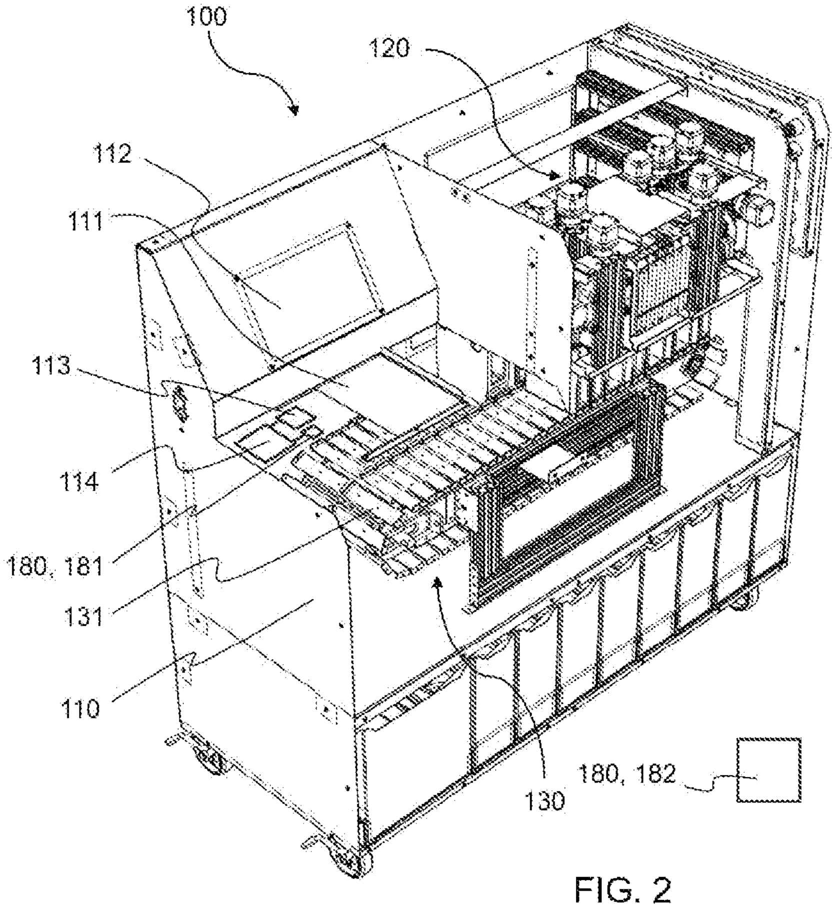
FIG. 2 shows a diagram in perspective view of the interior of the filling station according to the invention.

As can be seen on FIG. 2, showing the interior of the filling station 100, the opening 111 for placing and retrieving the cartridge gives access to a support 131 adapted for the cartridge 200 to be filled.

Hereinafter, the elements presented are shown on FIG. 2 in their state of mounting in the filling station 100, and on FIG. 3 in an exploded view showing only the tool unit 120.

A carousel of adapted supports 130 is arranged inside the filling station 100 so that the support 131 adapted for the cartridge 200 to be filled can be positioned opposite the opening 111 by rotating the carousel of adapted supports 130.

According to the type of cartridge 200 to be filled, the support 131 comprises a first conical tube with a conicity dependent on the type of cartridge, the first conical tube being inserted in an ink outlet of the cartridge 100 through its narrowest side, so as to create a sealed connection between the tube and the cartridge 200. In addition, the first conical tube thus exerts a pressure on an outlet valve of the cartridge 200, so as to open the valve.

Figure 3:
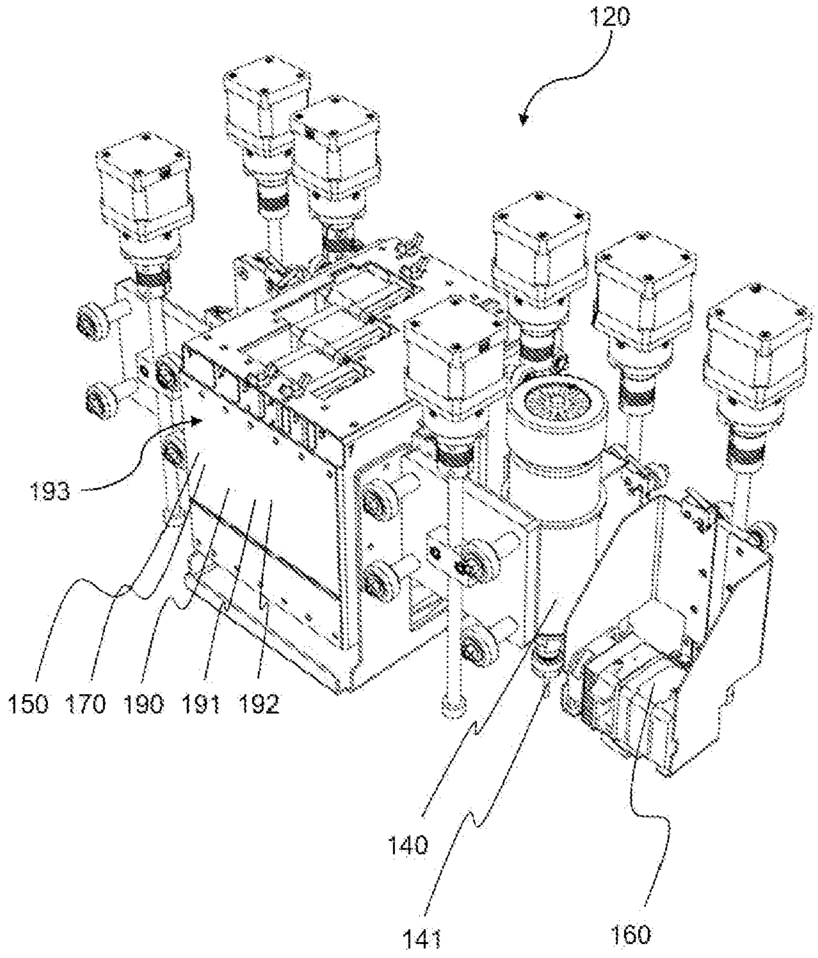
FIG. 3 shows a diagram in exploded perspective view of the tool unit of the filling station according to the invention.

As can also be seen at FIGS. 2 and 3, a milling unit 140 comprises a movable milling tool 141 is arranged inside the filling station 100.

The milling unit 140 is arranged above the carousel of adapted supports 130, so that the cartridge 200 positioned on its support 131 can be positioned opposite the milling tool 141 by rotating the carousel of adapted supports 130.

The milling tool 141 is movable on two axes in the two dimensions of space complementary to the movement axis of the carousel of cartridge supports, so as to be able to pierce the cartridge 200 at various positions, and to be able to control the depth of the piercing in the cartridge 200.

As can also be seen at FIG. 2, an ink-injection unit 150 is arranged inside the filling station 100.

The ink injection unit 150 is arranged above the carousel of adapted supports 130, so that the cartridge 200 positioned on its support 131 can be positioned opposite the ink-injection unit 150 by rotating the carousel of adapted supports 130.

The ink-injection unit 150 comprises a carousel of filling needles 151, a filling needle adapted to the type of cartridge and/or to the type of ink to be filled being able to be selected.

The filling needle selected is able to move on two axes in the two dimensions of space complementary to the movement axis of the carousel of cartridge supports, so as to be able to inject ink into the cartridge 200 at the various openings pierced previously, and to be able to control the depth of injection in the cartridge 200.

In addition, the ink-injection unit 150 comprises one or more ink reservoirs connected to the filling needle selected, said corresponding reservoirs generally each having a different ink colour, namely black, yellow, magenta and cyan.

In addition, the ink-injection unit 150 also comprises a second conical tube with a conicity of between 1 and 3%, the second tube being positioned in the previously pierced opening by its narrowest end, so as to obtain a sealed connection at the pressure between the filling needle and the cartridge 200, the filling needle being inserted in the second conical tube at the time of filling.

As can also be seen at FIG. 2, a unit for injecting sealing material 160 is arranged inside the filling station 100.

The unit for injecting sealing material 160 is arranged above the carousel of adapted supports 130, so that the cartridge 200 positioned on its support 131 can be positioned opposite the sealing material 160 by rotating the carousel of adapted supports 130.

The unit for injecting sealing material 160 comprises an element heating the sealing material, such as a nozzle provided with a heating element.

The nozzle is able to move on two axes in the two dimensions of space complementary to the movement axis of the carousel of cartridge supports, so as to be able to seal the various openings pierced previously, and to be able to control the depth of deposition of the sealing material.

In addition, the unit for injecting sealing material 160 comprises one or more reservoirs of sealing materials supplying the heating element. As a general rule, the reserve of sealing materials is composed of extruded plastic thread, or in other easily storable form.

More particularly, the sealing material is a polylactic acid (PLA) polymer comprising between 0 and 5% additive, the additive having properties of reducing the crystallization kinematics of the PLA polymer. Such an additive is for example talc.

As also visible in FIG. 2, a pressurization or depressurization unit 170 is arranged inside the filling station 100.

The pressurization or depressurization unit 170 is arranged above the carousel of adapted supports 130, so that the cartridge 200 positioned on its support 131 can be positioned facing the pressurization or depressurization unit 170 by rotating the carousel of adapted supports 130.

The pressurization or depressurization unit 170 comprises an air-injection needle that is inserted in the molten sealing material during cooling, and therefore during solidification.

During the solidification of the sealing material, an overpressure or under-pressure is created in the cartridge by blowing or sucking air through the air-injection needle.

The air-injection needle is withdrawn from the cartridge when the nominal pressure of the reservoir or reservoirs of the cartridge is reached, and when the molten material is sufficiently solid not to yield in front of the pressure or overpressure created, but still sufficiently ductile to spontaneously close the opening left when the air-injection needle is withdrawn.

The air-injection needle is able to move on two axes in the two dimensions of space complementary to the movement axis of the carousel of cartridge supports, so as to be able to pressurize or depressurize each of the reservoirs of the cartridge 200 corresponding to the various openings previously pierced.

The overpressure or under-pressure in the cartridge 200 is obtained by a reversible compressive system, such as the variation in the volume of a compression or decompression chamber, the chamber being connected hermetically to the air-injection needle or a reversible pump. The volume of said chamber is varied by moving a piston hydraulically, pneumatically, electrically or any other known means. In its most simplified version, said chamber is a syringe the piston of which is moved by means of a mechanical actuator. In the case of the use of a pump, the characteristics of flow rate and pressures are controlled by command in relation to the information associated with the cartridge.

Advantageously, the filling station 100 also comprises a unit 190 for cleaning print heads of the cartridge, a unit 191 for emptying the residual ink in the cartridge 200, said emptying unit comprising a reservoir for emptying the residual ink, and a priming unit 192, said priming unit making it possible, for example by sucking air at an ink outlet of the cartridge 200 such as a print head, to make the ink filled in the cartridge emerge through said ink outlet, so as to allow immediate use of the cartridge, without risk of damage to the cartridge 200 or to the associated printer.

It should be stated that the ink-filling carousel 151, the air-injection needle and the cleaning and emptying connectors are, in the non-limitative example presented here, arranged in a selector 193.

Figure 4:
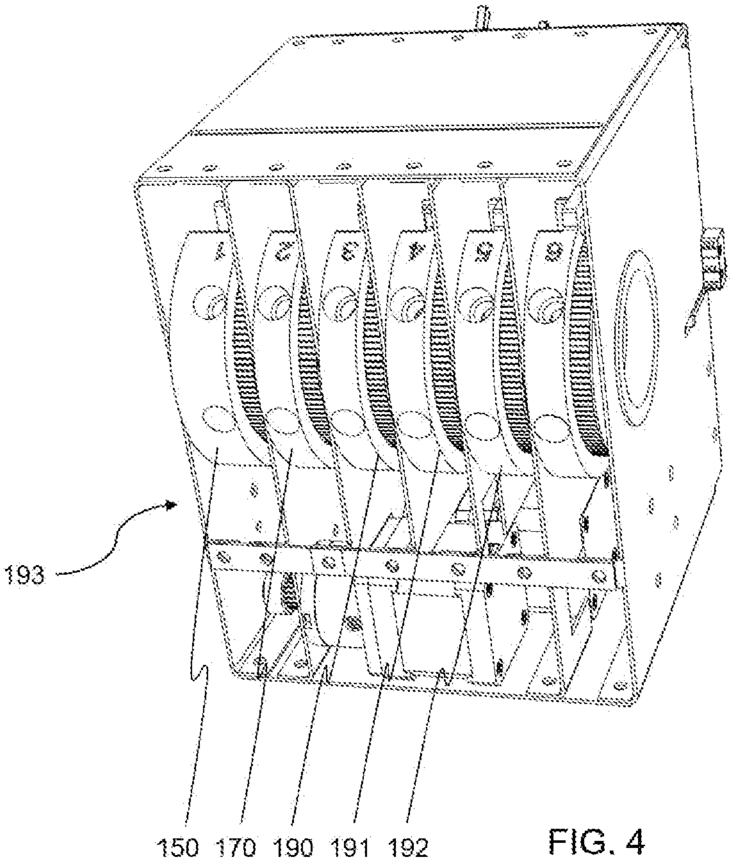
FIG. 4 shows a diagram in perspective view of the underside of the selector of the filling station according to the invention.

The selector 193 is shown in FIG. 4 in view from below, the needles and connectors not being shown. The indices 1 to 6 shown in the figure correspond to the location of carousels making it possible to select the various aforementioned elements.

In addition, the filling station 100 advantageously comprises a tester for the presence of the cartridge 200, a chip reader in order to read the information contained in a chip integrated in the cartridge 200, and a cartridge presser, making it possible to ensure a position of the cartridge 200 at the bottom of the support 131 for a perfect seal in the ink outlet and for precise positioning for the various operations described previously.

In addition, advantageously, the unit 160 for injecting sealing material also comprises a wheel that crushes the PLA after withdrawal of the air-injection needle, since some printers provide a space of only a few tenths of a millimeter between the top of the cartridge and the frame of the printer. Thus, any excess of material is flattened after the sealing in order to guarantee a flat surface on the surface of the cartridge at the sealing point.

It should be stated that all the tools and the movable parts of the units and components disclosed above are motorized by means of stepping motors, making it possible to achieve a precision of movement in the three spatial dimensions of the order of half a tenth of a millimeter.

The filling unit 150 comprises a peristaltic pump precise to a tenth of a millimeter, and the duration of filling controlled by the central electronic unit 113 is precise to a tenth of a second. In this way, the cartridge filling volume is implemented very precisely.

The pressurization or depressurization is implemented with a precision to a tenth of a bar.

All the electrical components of the filling station 100 are supplied with electricity by means of an electricity supply interface, itself connected to a plug connecting to an electrical system or any other electrical energy source.

A method 300 for filling an ink cartridge by means of the filling station 100 will now be described.

Figure 5:
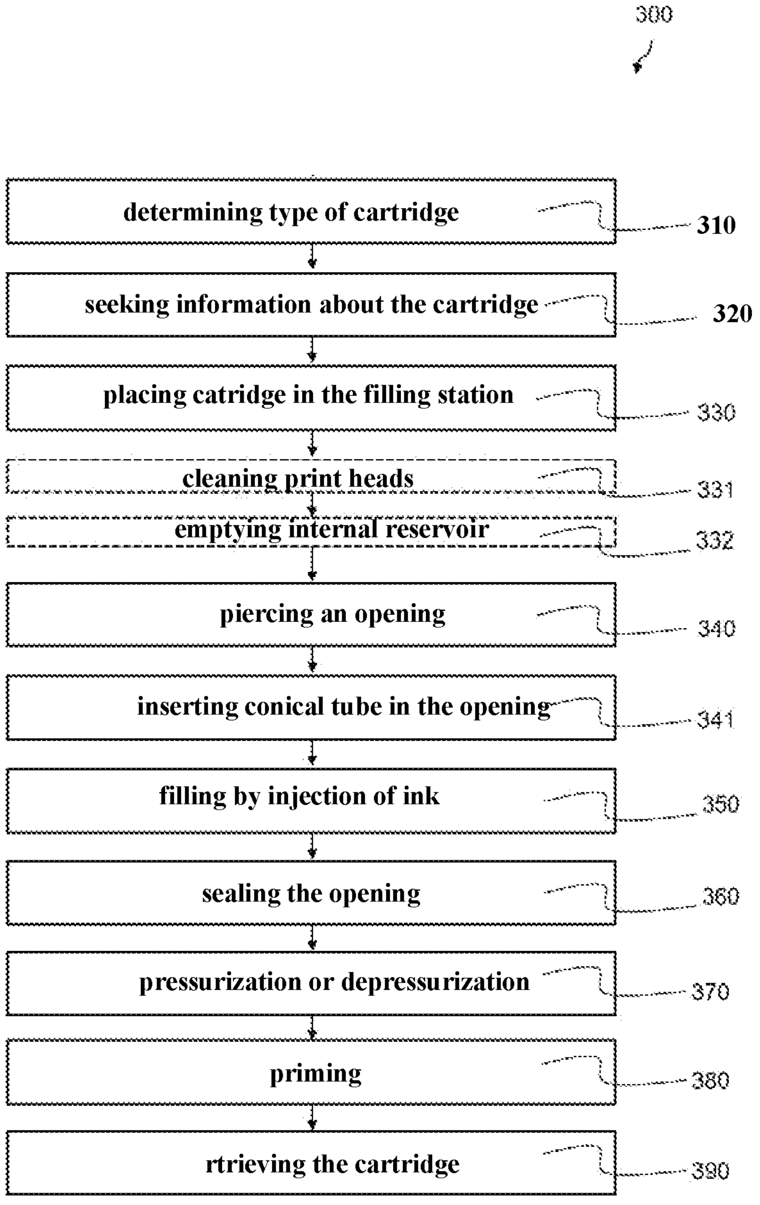
FIG. 5 shows, in logic diagram form, steps implemented in a particular embodiment of the method that is the object of the present invention.

FIG. 5 is a logic diagram showing steps of the filling method 300 described below.

During a first step 310 of determining the type of cartridge to be filled, the user enters the manufacturer reference of the cartridge 200 through the man-machine interface 112. This information is stored in a memory of the central electronic unit 113.

Next, during a step 320 of seeking in a database, information associated with the cartridge to be filled is sought in the database 180 from the manufacturer reference previously recorded. This information is next stored in the memory of the central electronic unit.

The information associated with the cartridge to be filled is composed of a plurality of information elements, and comprises at least the elements in the following list: the number of piercings of through openings to be made, the position of each piercing of through opening to be made, the type of technology of each internal reservoir of the cartridge, the types of ink to be injected, the number of filling points for each type of ink to be injected, the filling rate of each internal reservoir of the cartridge, the filling pressure of the ink of each internal reservoir, the duration of filling of each internal reservoir of the cartridge, the number of sealings of through openings to be implemented, the position of each sealing of through opening to be implemented, the melting point, the speed of injection and the injection pressure gradient of the sealing material for each through opening to be sealed, the filling pressure of each internal reservoir.

These information elements make it possible to adapt the filling method 300 to any type of cartridge, provided that the type of cartridge is referenced in the database 180. These information elements are determined from the geometry of each type of cartridge as well as the manufacturer data relating to each type of cartridge.

The filling method 300 next comprises a step 330 of placing the cartridge 200 in the filling station 100. The placing is done by the user wishing to fill the cartridge 200 by positioning the cartridge 200 on the support 131 corresponding to the type of cartridge to be filled. The support 131 is selected by the filling station from the information associated with the type of cartridge to be filled, the carousel of supports 130 being actuated until the support 131 corresponding to the type of cartridge to be filled is positioned in front of the opening for placing and retrieving the cartridge 111.

In general, a print cartridge 200 has a substantially right angled parallelepipedal shape, with three main dimensions, where the dimension that is substantially less than the other two is designated as being the width of the cartridge.

In general, a print cartridge 200 has a face including an ink outlet that can be designated as being the bottom of the cartridge is an opposite face that can be designated as being the top of the cartridge.

When the cartridge is put in place, the user positions the cartridge on the support 131 from below.

The cartridge 200 has an external wall separating one or more internal reservoirs from the outside of the cartridge, and may comprise, on a part of an external wall, a double external wall adjacent to at least one internal reservoir.

Before the piercing step 340 described below, an optional step 331 of cleaning the print head or heads of the cartridge can be implemented by the print-head cleaning unit 190, according to the type of cartridge 200 to be filled. This step may itself be followed by an emptying step 332 by means of the emptying unit 9, aimed at eliminating any residual volume of ink before filling the cartridge 200. These two techniques are known per se from the prior art and are not explained here.

During a piercing step 340, an opening passing through the external wall to at least one of the internal reservoirs is pierced by the milling unit 140.

The piercing is implemented vertically in line with the most retracted internal reservoir in the chain of circulation of the fluid towards the ink outlet, in the case of a cartridge with communicating internal reservoirs.

The piercing diameter is less than half the width of the cartridge.

When the wall includes an external skin and an internal skin, a first piercing of the external skin and a second piercing of the internal skin are implemented. The diameter of the second piercing is less than the diameter of the first piercing.

Thus, the piercing is staged. The piercing diameter of the external skin is greater than that of the internal skin in order to allow:

- a pressing in of the first conical tube guaranteeing a perfect seal with the internal reservoir;
- a sequential blocking by the sealing unit that is efficient for a hydrodynamic configuration identical to the situation before filling, i.e. the openings are re-blocked only on the thickness of a skin and allow the circulation of liquid or gaseous fluid between the skins.

Advantageously, the filling method 300 comprises a step 341 of inserting the first conical tube in the opening pierced during the previous step 340, in order to guarantee impermeability to the pressure between the internal reservoir and the filling needle, introduced during the following step.

The filling method 300 comprises a step 350 of filling by injection of ink by the ink-injection unit 150 through the through opening pierced in the internal reservoir under ink-injection conditions dependent on the information associated with said cartridge to be filled.

Said conditions are in particular the nominal volume of the cartridge to be filled, the maximum filling pressure in order not to disturb or damage the valves managing pressure between internal reservoirs and the outlet of the fluid, in the case of communicating multiple reservoirs, as well as a speed of injection of the ink to respect the volume absorption capacity of the foam in the ink reservoir.

More precisely, the filling needle is introduced into the first conical tube, until it is introduced into the reservoir of the cartridge 200.

The depth of penetration of the filling needle in the internal reservoir is fixed, or changing over time continuously or discretely, the depth being dependent on the information associated with the cartridge, and more precisely the reservoir technology used in the cartridge (liquid, spongy, spongy with multiple stages etc. reservoir) as well as its gravitic state.

Next, in a sealing step 360, the through opening is sealed by cooling a deposit of the molten plastics material by the sealing-material injection unit 160 in said through opening under sealing conditions dependent on the information associated with the cartridge to be filled.

More precisely, a speed of ejection of the molten material to block the opening to be sealed without creating a rim on a side of the wall or of the skin, and without risking significant contraction during cooling and therefore shrinkage of the material, an optimum melting point and a pressure gradient of the injection of molten material are information elements associated with the cartridge to be filled.

Next, in a pressurization or depressurization step 370, the internal reservoir or reservoirs are taken to a set pressure by blowing or suction of air by the pressurization or depressurization unit 170 in the internal reservoir, the set pressure given by the information associated with the cartridge.

Advantageously, blowing or sucking air in the internal reservoir is done through the air-injection needle introduced into the molten plastics material, said needle being withdrawn after the set pressure is reached and after a degree of crystallinity of the plastics material of less than or equal to 20% is reached.

As indicated above, the sealing material is a polylactic acid (PLA) polymer comprising between 0 and 5% additive, said additive having properties of reducing the crystallization kinematics of said PLA polymer.

Figure 6:
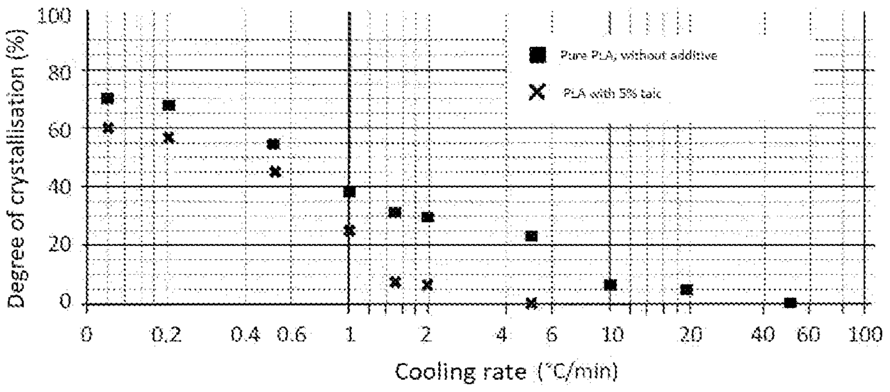
FIG. 6 shows a graph of the degree of crystallinity according to the cooling speed of the filling material according to the invention.

FIG. 6 shows a graph of the degree of crystallinity, as a percentage of the material, according to the cooling rate, in degrees Celsius per minute, of said material. The graph of the material of FIG. 6 represents the behavior of a PLA without additive (squares on the graph) and of a PLA with 5% talc (crosses on the graph). It is clear here that the use of an additive in the PLA makes it possible to achieve a degree of crystallinity of less than 20% with a cooling rate that is much lower compared with a pure PLA. In other words, the degree of crystallinity of 20% can be reached in a very short period for a PLA with addition compared with a pure PLA, without requiring cooling means or prolonged waiting.

In addition, it must be emphasized that, during the sealing step 360, the optimum melting point of the PLA is determined for a controlled deposition under initial conditions for the cooling, and therefore control of the crystallization time for injection of the pressure.

Alternatively, the pressurization or depressurization step 370, or more precisely the blowing or suction of air in the internal reservoir, is implemented through an emergence of ink from said cartridge.

During a priming step 380, a predetermined volume of ink is expelled from the cartridge 200, so that the ink filled in the cartridge reaches the ink outlet of the cartridge, and so that the cartridge is thus ready for use without risking damaging it or damaging the associated printer.

Finally, during a step 390 of return of the cartridge 200, the cartridge, filled and ready for use, is presented in front of the opening 111 of the filling station 100, and returned to the user.

LIST OF REFERENCE SIGNS

TABLE 1

| References | Designations |
|---|---|
| 100 | Filling station |
| 110 | External casing |
| 111 | Opening for placing and retrieving the cartridge |
| 112 | Man-machine interface |
| 113 | Central electronic unit |
| 114 | Interface for access to a database |
| 120 | Tool unit |
| 130 | Carousel of supports |
| 131 | Cartridge support |
| 140 | Milling unit |
| 141 | Milling tool |
| 150 | Ink-injection unit |
| 151 | Carousel of ink-filling needles |
| 160 | Unit for injecting sealing material |
| 170 | Pressurization or depressurization unit |
| 180 | Database |
| 181 | Non-volatile storage memory |
| 182 | Remote server |
| 190 | Unit for cleaning print heads |
| 191 | Emptying unit |
| 192 | Priming unit |
| 200 | Ink cartridge to be filled |
| 300 | Method for filling an ink cartridge |
| 310 | Step of determining a cartridge type |
| 320 | Step of searching in a database |
| 330 | Step of placing the cartridge |
| 331 | Step of cleaning print heads |
| 332 | Emptying step |
| 340 | Piercing step |
| 341 | Step of inserting the first conical tube |
| 350 | Filling step |
| 360 | Sealing step |
| 370 | Pressurization or depressurization step |
| 380 | Priming step |
| 390 | Step of retrieving the cartridge |

The invention claimed is:

1. A method for filling an ink cartridge for a printer in an ink- filling station, comprising:

determining a type of the ink cartridge to be filled;

seeking, in a database, at least one item of information associated with the ink cartridge to be filled;

placing the ink cartridge to be filled in the ink-filling station, the ink cartridge to be filled comprising a wall separating one or more internal reservoirs of the ink cartridge from the outside of the ink cartridge;

piercing a through opening passing through the wall from the outside of the ink cartridge to said one or more internal reservoirs, a position of the through opening being dependent on said at least one item of information associated with the ink cartridge to be filled;

filling, by injecting an ink through the through opening of said one or more internal reservoirs under ink-injection conditions, relating to a rate of injection of the ink and a time, both dependent on said at least one item of information associated with the ink cartridge to be filled, the filling of said one or more internal reservoirs with the ink is implemented through a filling needle introduced into said one or more internal reservoirs, a depth of penetration of the filling needle in said one or more internal reservoirs being fixed, or changing over time continuously or discretely, the depth of penetration being dependent on said at least one item of information associated with the ink cartridge;

sealing by cooling a deposit of molten plastics material in the through opening under sealing conditions dependent on said at least one item of information associated with the ink cartridge to be filled, the plastics material is a polylactic acid (PLA) polymer comprising greater than 0 but less than or equal to 5% additive, the additive having properties of reducing crystallisation kinematics of said PLA polymer; and pressurizing or depressurizing following the sealing of the through opening, during which at least one internal reservoir is taken to a set pressure by blowing or sucking air in said at least one internal reservoir.

2. The method of claim 1, wherein the blowing or suction of air in said at least one internal reservoir is implemented through an air-injection needle introduced into the molten plastics material, the air-injection needle being withdrawn after the set pressure is achieved and after a degree of crystallinity of the plastics material of less than or equal to 20% is achieved.

3. The method of claim 1, wherein the blowing or suction of air in said at least one internal reservoir is implemented through an ink outlet of the ink cartridge.

4. The method of claim 1, wherein said at least one item of information associated with the ink cartridge to be filled comprises at least elements in the following group:

a) a number of piercings of through openings to be made;
b) a position of each piercing of the through opening to be made;
c) a type of technology of each internal reservoir of the ink cartridge;
d) types of ink to be injected;
e) a number of filling points for each type of ink to be injected;
f) a filling rate of said each internal reservoir of the ink cartridge;
g) a filling pressure of the ink of said each internal reservoir;
h) a duration of filling of said each internal reservoir of the ink cartridge;
i) a number of sealings of the through openings to be implemented;
j) a position of each through opening sealing to be implemented;
k) a melting point, a speed of injection and an injection-pressure gradient of a sealing material for each through opening to be sealed; and
l) a filling pressure of said each internal reservoir.

5. The method of claim 1, further comprising:

emptying preceding the piercing, during which each internal reservoir of the ink cartridge is emptied of a residual volume of the ink; and priming following the pressurization or depressurization, during which a predetermined volume of ink filled in the ink cartridge is expelled from the ink cartridge through an ink outlet of the ink cartridge.

6. The method of claim 1, further comprising, prior to piercing, cleaning one or more print heads of the ink cartridge.

7. A filling station to fill an ink cartridge for a printer implementing the method of claim 1, the station comprising:

an external envelope provided with an opening to place and retrieve the ink cartridge;

a carousel of supports configured to accommodate various types of ink cartridges;

a milling unit comprising a movable milling tool;

an ink-injection unit comprising a carousel of filling needles, and one or more ink reservoirs to be injected;

a material-injection unit to inject a sealing material, the material-injection unit comprising a reservoir of one or more sealing materials, a heater to heat the sealing material and a movable nozzle;

an interface to a database comprising information associated with the type of the ink cartridge;

a pressurisation or depressurisation unit comprising one or more air-injection needles and a reversible compressive system; and a microprocessor to process the information associated with the type of the ink cartridge and to control the piercing, ink-injection unit and material-injection unit, and the carousel of supports.

8. The filling station of claim 7, further comprising a man-machine interface to determine the type of the ink cartridge from the information transmitted through the interface to the database.

9. The filling station of claim 7, further comprising:

a print-head cleaning unit;

an emptying unit comprising a reservoir to empty the residual volume of the ink in the ink cartridge; and a priming unit to expel a predetermined volume of the ink filled in the ink cartridge through an ink outlet of the ink cartridge.

* * * * *